UNITED STATES PATENT OFFICE.

ALBERT HAYES, OF NEW YORK, N. Y., ASSIGNOR TO ARTHUR F. RAY, OF WOBURN, MASSACHUSETTS.

COMPOSITE MOTOR-FUEL.

1,338,982.     Specification of Letters Patent.     Patented May 4, 1920.

No Drawing.     Application filed September 19, 1919. Serial No. 324,920.

*To all whom it may concern:*

Be it known that I, ALBERT HAYES, a citizen of the United States, residing at New York, in the county of New York, State of New York, have invented certain new and useful Improvements in Composite Motor-Fuel, of which the following is a description.

My invention relates to composite motor fuels for use in explosion engines and for like purposes and has for its object to produce a liquid fuel having alcohol as its basis and principal component without admixture of any petroleum product or other so-called hydrocarbon, which will be of a stable, homogeneous and permanently non-stratifying character and will be adapted for use in explosion engines of ordinary construction with carbureters such as are ordinarily used for gasolene, to form with the usual admixture of air, an explosive mixture which will be at least as effective as that formed when gasolene is used.

With the above object in view my invention consists in the composition of matter hereinafter described and claimed for forming a motor fuel.

The motor fuel consists of a mixture of alcohol, ether and water. The proportions of these components which I prefer to use are:

Alcohol_____ 75 parts.
     Ether_____ 10 parts.
     Water_____ 15 parts.

but these proportions may be varied somewhat and the statement of proportions is to be understood as approximate only.

The alcohol used is preferably ethyl alcohol and may or may not be denatured and may be produced from any material and need not be free from impurities. In the above statement of proportions the alcohol is assumed to be 95 per cent. strength but alcohol of less strength may be used but if such alcohol is used the proportion of added water should be reduced to allow for the water carried by such alcohol. Methyl alcohol may be used instead of ethyl alcohol or a mixture of the two but ethyl alcohol is, of course, preferable on account of its being more readily obtainable and its freedom from the objections to the use of methyl alcohol. The ethyl alcohol used may contain fusel oil to an extent that would render it unfit for use as a beverage or extractive matter which would be objectionable in alcohol intended for use as a beverage. The ether preferred is ordinary ether, that is ethyl ether, and may be used in crude form but methyl ether or mixed ether may be used.

No petroleum product or other so-called hydrocarbon is intended to be added to the motor fuel compounded as above described.

The presence in the motor fuel and, of course, in the explosive mixture formed from it, of so large a proportion of water as above described acts to prevent the deleterious action on the lubricating oil in the engine cylinder which the alcohol or alcohol and ether would otherwise have. But the most important function of the water is to absorb and hold the ether in permanent combination which it does owing to its capacity for absorbing, particularly in the presence of alcohol, a considerable proportion of its volume of water. By using water in the proportion above described, that is in excess of the ether used, a much larger amount of the ether is thus held in permanent combination than could be so held by a small amount of water.

Having thus described my invention what I claim is:

1. A motor fuel composed of alcohol, ether and water in which the amount of water exceeds the amount of ether.

2. A motor fuel composed of alcohol, ether and water, the water constituting not less than 15 per cent.

3. A motor fuel composed of ethyl alcohol, ether and water in which the amount of water exceeds the amount of ether.

4. A motor fuel composed of the following components in substantially the following proportions;

Alcohol_____ 75 parts.
     Ether_____ 10 parts.
     Water_____ 15 parts.

In testimony whereof I affix my signature this 19th day of September, 1919.

ALBERT HAYES.